March 19, 1963  YASUTAKA GOTO  3,081,667
DEVICE FOR PRODUCING PUPPET ANIMATION FILMS
Filed Dec. 10, 1959
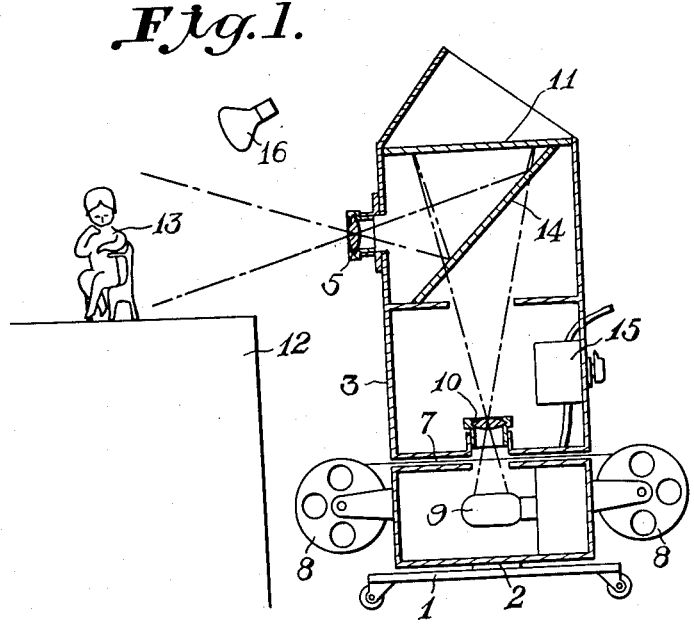
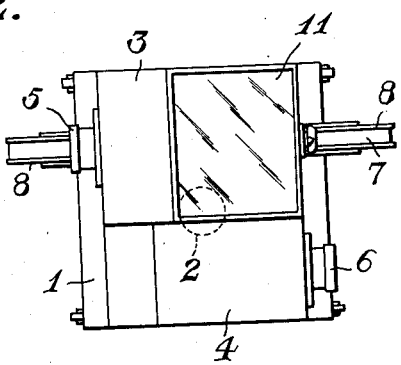
YASUTAKA GOTO
INVENTOR.

United States Patent Office 3,081,667
Patented Mar. 19, 1963

3,081,667
DEVICE FOR PRODUCING PUPPET
ANIMATION FILMS
Yasutaka Goto, 59 4-chome, Denenchofu, Ota-ku,
Tokyo, Japan
Filed Dec. 10, 1959, Ser. No. 858,712
4 Claims. (Cl. 88—16)

This invention relates to a device for producing puppet animation films and has the object of obtaining realistic doll-films or puppet films.

In a usual production of doll-films the producers have determined the behaviors of the dolls or puppets in each film frame usually depending on his sixth sense. With such a production method the doll-film or puppet film produced has the disadvantage that it lacks truthfulness to life. Moreover, the production has been attended with many failures, through years and at great expense. It is therefore an object of the invention to eliminate these disadvantages and provide a camera, with the aid of which one can produce a realistic doll-film or puppet film in shorter time and without a great deal of skill.

The invention is illustrated by way of example in the accompanying drawings in which:

FIG. 1 is a longitudinal section through an embodiment according to the invention, and FIG. 2 is a plan view corresponding to FIG. 1.

Referring to the drawing, on the base 1 a frame 3 of an image-superimposition-means and means for photographing 4 are rotatably mounted by means of a supporting bearing 2. In this case both objectives 5 and 6 of the image-superimposition-means and the means for photographing can be brought in turn into the same position by turning of the supporting bearing 2, as shown in the drawing. It is also possible instead of above mentioned arrangement to mount the image-superimposition-means and the means for photographing in such a way on a carriage, which can slide to either side, that said both objectives 5 and 6 can be brought in turn into the same position. At the lower part of the frame 3 of the image-superimposition-means there are located film spools 8 for the film 7, in which persons have been already filmed, who acted according to the predetermined motions of the puppets. The film 7 can be advanced manually one frame by one frame and the image of every frame is projected on the screen 11 through a lens system 10 by means of an electric bulb 9. A puppet 13 which is manipulated on the stage 12 is projected also on the screen 11 through the objective 5 and a semitransparent mirror 14, so that both the images are superimposed on each other on the screen 11. Then the puppet is set, so that its image is in complete or close accord with the image of the person in the film on the screen 11. The image-superimposition-means and the means for photographing are turned by means of the supporting bearing 2 until the objective 6 of the means for photographing is brought into the position of the objective 5 of the image-superimposition-means in order to take a photograph of the puppet 13 on one film frame. The above mentioned process is repeated for each frame of the film put in the means for photographing, which results in a completion of a film, in which the puppet 13 acted according to the motion of the person who had previously acted.

A rheostat 15 is, moreover, arranged in the circuit of the electric bulb 9, whereby the brightness of the image of the film 7 on the screen 11 can be controlled against that of the image of the puppet 13, which is illuminated by an illuminator 16, on the same screen.

Having thus described the invention what is claimed as new and desired to be secured by Letters Patent is:

1. A device for arranging of puppets in animated poses for taking a series of animated photos of said puppets comprising a housing, a viewing screen disposed in a wall of said housing, first objective means on said housing aligned for viewing a puppet, a semi-transparent mirror disposed in the light path of said first objective means and arranged to reflect the image of said puppet on said viewing screen, film objective means mounted in said housing, means for positioning film having an image of a living creature whose antics are to be duplicated by said puppet located in alignment with said film objective means, light means in said housing arranged to direct light through said film and said film objective means through said mirror and onto said screen whereby said puppet and the image on said film may be viewed simultaneously to permit arrangement of said puppet to duplicate the image of said living creature.

2. A device according to claim 1, wherein said light means includes means to vary the intensity of light to vary the intensity of the image projected on said screen.

3. A device according to claim 1, including means for pivotally supporting said housing and wheel means on said support means for moving said housing.

4. A camera for taking a series of animated photos of puppets and the like, comprising a housing, a viewing screen disposed in the wall of said housing, first objective means on said housing aligned for viewing a puppet, a semi-transparent mirror disposed in the light path of said first objective means and arranged to reflect the image of said puppet on said viewing screen, film objective means mounted in said housing, means for positioning film having an image of a living creature whose antics are to be duplicated by said puppet located in alignment with said film objective means, light means arranged in said housing to direct light to said film and said film objective means through said mirror and onto said screen, whereby said puppet and the image on said film may be viewed simultaneously to permit arrangement of said puppet to duplicate the image of said living creature, photographic camera means having an objective mounted on said housing, said housing being pivotally mounted to permit said photographic camera means to be interchanged and positioned in place of said first objective means, whereby after said puppet is arranged it may be immediately photographed.

References Cited in the file of this patent
UNITED STATES PATENTS

| | | |
|---|---|---|
| 2,241,929 | Kendig | May 13, 1941 |
| 2,494,000 | Robertson | Jan. 10, 1950 |
| 2,599,624 | Gillette | June 10, 1952 |